US006631141B1

(12) United States Patent
Kumar et al.

(10) Patent No.: US 6,631,141 B1
(45) Date of Patent: Oct. 7, 2003

(54) METHODS, SYSTEMS AND COMPUTER PROGRAM PRODUCTS FOR SELECTING AN AGGREGATOR INTERFACE

(75) Inventors: Arush Kumar, Durham, NC (US); Loren Douglas Larsen, Durham, NC (US); Jeffrey James Lynch, Apex, NC (US)

(73) Assignee: IBM Corporation, Armonk, NY (US)

( * ) Notice: Subject to any disclaimer, the term of this patent is extended or adjusted under 35 U.S.C. 154(b) by 0 days.

(21) Appl. No.: 09/321,330

(22) Filed: May 27, 1999

(51) Int. Cl.[7] .................................................. H04J 3/22
(52) U.S. Cl. ...................... 370/469; 370/401; 370/235; 370/429; 709/105; 709/238
(58) Field of Search ................................. 370/469, 229, 370/230, 230.1, 235, 235.1, 238, 252, 254, 389, 400, 401, 402, 408, 445, 412, 413, 414, 464, 465, 463, 422, 423, 428; 709/100, 103, 104, 105, 226, 238, 241, 231

(56) References Cited

U.S. PATENT DOCUMENTS

| | | | | |
|---|---|---|---|---|
| 5,243,704 | A | | 9/1993 | Baty et al. ............... 395/325 |
| 5,400,324 | A | | 3/1995 | Eriksson et al. ........... 370/60 |
| 5,418,779 | A | | 5/1995 | Yemini et al. ............. 370/54 |
| 5,524,111 | A | | 6/1996 | Le Pennec et al. ........ 370/84 |
| 5,535,195 | A | | 7/1996 | Lee ......................... 370/54 |
| 5,627,969 | A | | 5/1997 | Kobayashi et al. ...... 395/200.1 |
| 5,768,277 | A | | 6/1998 | Ohno et al. .............. 370/457 |
| 5,805,817 | A | | 9/1998 | Yu et al. ................ 395/200.54 |
| 5,959,968 | A | * | 9/1999 | Chin et al. ............... 370/216 |
| 6,049,528 | A | * | 4/2000 | Hendel et al. ........... 370/235 |
| 6,072,797 | A | * | 6/2000 | Fletcher .................. 370/394 |
| 6,363,077 | B1 | * | 3/2002 | Wong et al. ............. 370/422 |
| 6,385,201 | B1 | * | 5/2002 | Iwata ..................... 370/400 |
| 6,473,424 | B1 | * | 10/2002 | DeJager et al. .......... 370/389 |

OTHER PUBLICATIONS

*Method of Bandwidth Management by Dynamic Port Configuration, IBM Technical Disclosure Bulletin*, vol. 34, No. 7A, pp. 261–265 (Dec. 1991).
Load Balancing for Multiple Interfaces for Transmission Control Protocol./Internet Protocol for VM/MVS, *IBM Technical Disclosure Bulletin*, vol. 38, No. 09, pp. 7–9 (Sep. 1995).
*Local Area Network Switch Frame Lookup Technique for Increased Speed and Flexibility, IBM Technical Disclosure Bulletin*, vol. 38, No. 07, pp. 221–222 (Jul. 1995).
Jeffree, T., et al., *Supplement to Carrier Sense Multiple Access with Collision Detection (CSMA/CD) Access Method & Physical Layer Specifications: Link Aggregation, IEEE Draft P802.3as/D1.1*, pp. 1–172 (IEEE., 1999).

* cited by examiner

Primary Examiner—Dang Ton
Assistant Examiner—Tri Phan

(57) ABSTRACT

Methods, systems and computer program products are provided for which associate physical links of a network device to aggregator ports of the network device where there are more physical links of the network device capable of aggregation than aggregator ports of the network device. Physical links are associated with the aggregator ports of the network device based on a session invariant characteristic of the physical links until either all of the aggregator ports of the network device have been associated with physical links or all of the physical links capable of aggregation have been associated with an aggregator port. The remaining physical links are then utilized as single links to the network device irrespective of the physical link's capability to aggregate.

39 Claims, 4 Drawing Sheets

METHODS, SYSTEMS AND COMPUTER PROGRAM PRODUCTS FOR SELECTING AN AGGREGATOR INTERFACE

FIELD OF THE INVENTION

The present invention relates to network management and control in general and in particular to the management of networks utilizing aggregator ports to allow multiple links between two nodes in the network.

BACKGROUND OF THE INVENTION

Currently, the Institute of Electrical and Electronic Engineers (IEEE) 802.3ad Task Force is developing a definition for a link aggregation standard. Link aggregation treats multiple physical links as a single network media access control (MAC) interface visible to higher layers. This single logical MAC interface is provided by an aggregator. Each aggregator is associated with from 1 to N physical links. The rules that determine the assignment of a group of physical links to an aggregator are called selection rules.

When a physical link aggregates with one or more other physical links the links in this aggregation group are assigned to an aggregator or a logical aggregator port that is visible to the higher protocol layers in place of the physical links in the aggregation group. In order to determine which physical links are capable of aggregation, each physical port to which a physical link is connected and each aggregator port is assigned a key value. The key value may be an arbitrary value assigned to the physical port or the aggregator port. However, physical ports with the same key value may be aggregated. Thus, if each aggregator port is assigned a unique key value then all physical ports that have the same key value as an aggregator port are assigned to that aggregator port as an aggregation group. To configure a link as outside an aggregation group, the link is assigned a key value which does not match the key value of an aggregator port.

In order for devices within a network to be self configuring and to allow for the detection of errors, each device in the network is typically assigned a unique system identification (System ID) within the network. Each physical port of a network device is also typically assigned a key value. To aggregate physical links between two network devices, each device will transmit to the other device its System ID and the key value of the physical port connecting the two devices. After receiving the information from the other device, each device will attempt to aggregate physical ports which have compatible link parameters (e.g. link speed), have identical local key values and both the remote System ID and key values are identical.

To maximize the number of aggregation groups and to support "plug and play" configuration, it may be useful to configure all aggregator ports and all physical ports with the same initial key values. This will cause the network devices to form as many aggregation groups as possible. Such an assignment of key values may work if there are at least as many aggregator ports as physical ports. However, problems in system predictability may occur in a system where there are more groups of links capable of aggregation than there are aggregator ports in a device. In such a case, which physical ports are assigned to an aggregator port may depend on the timing of the determination or other variables which could result in unpredictable results. Unpredictable results are undesirable because it may preclude automated processes, such as error recovery, power outage recovery or other such events which may cause a network to be reconfigured. Therefore, without predictable results, the aftermath of many of these events may require manual configuration of the network or other operator intervention to return the network to the preevent configuration.

SUMMARY OF THE INVENTION

Accordingly, it is an object of the present invention to provide methods, systems and computer program products for the management of aggregator ports in a network.

It is a further object of the present invention to provide such methods, systems and computer program products which allow for the predictable selection of the physical ports associated with an aggregator port in the instance where there are more physical ports capable of aggregation than aggregator ports.

These and other objects can be provided, according to the present invention, by methods, systems and computer program products which associate physical links of a network device with aggregator ports of the network device where there are more potential aggregation groups than aggregator ports of the network device. Physical links are associated with the aggregator ports of the network device in a predictable sequence based on a session invariant characteristic of the physical links until either all of the aggregator ports of the network device have associated groups of physical links or all of the physical links capable of aggregation have been associated with an aggregator port. The remaining physical links may then be used as single links to the network device irrespective of the physical link's capability to aggregate.

By grouping physical links and associating the group with aggregator ports in a predictable sequence based on a session invariant characteristic of the links, a repeatable configuration may be maintained. The session invariant characteristic of the links provides the basis for establishing the same configuration from session to session. For example, after a power outage or after a system shut down, because the session invariant characteristics of the links do not change, the association of the links to aggregator ports would also not change. Thus, the difficulties associated with an unpredictable configuration of the network may be avoided. Accordingly, maintenance and other routine service may be performed without the need to manually reconfigure the system afterwards. Furthermore, recovery from power outages or other service interruption events may be automated and result in a predictable network configuration.

In a particular embodiment of the present invention, physical links are grouped and associated with aggregator ports by determining a system identification associated with a remote end of each of the physical links connected to the network device. A port key associated with the remote end of each of the physical links connected to the network device is also determined. Physical links are then grouped and associated with the aggregator ports of the network device in a predictable sequence based on both the system identification and the port key associated with the physical link. Such a grouping and association may be carried out by associating physical links with the same system identification value and port key value with the same aggregator port in a predictable order based on the system identification values of the physical links. Preferably, the predictable order is a sequential order and more preferably an ascending sequential order.

In a further embodiment of the present invention, the system identification on which the aggregator port associations are based is a globally unique system identifier of the remote system.

In yet another embodiment of the present invention, an association of physical links with an aggregator port is terminated if a request is received to aggregate physical links having a system identification within the sequence of system identifications of physical links assigned to aggregator ports. Preferably; the association of physical links with an aggregator port terminated is an association of physical links having a system identification value at the boundary of the sequence of system identification values assigned to aggregator ports.

By updating the assignment of physical links to aggregator ports if a subsequent request is received from a link with an associated system identification within the sequence of system identifications of physical links assigned to aggregator ports, the predictable sequence may be maintained. Thus, even if the network configuration has been altered since the initial assignment of aggregator ports, the present invention provides for accommodating such modifications so that the aggregator port configuration takes into account such changes. Thus, for example, when a network device is taken out of service and then returned to service, the configuration of aggregator ports returns to that which existed prior to the device being taken out of service.

In a particular embodiment of the present invention, physical ports of a network device are associated with aggregator ports of the network device by receiving a link aggregation message from one of the physical ports of the network device. The received message is parsed for a globally unique system identification and port key of a remote system associated with the physical port on which the message was received. The physical port on which the message was received is then assigned to a potential aggregation group based on the globally unique system identification and port key values of the remote system associated with the physical port. It is then determined if either a message has been received from each of the physical ports of the network device or the expiration of a hold time, has occurred. Potential aggregation groups are then associated with the aggregator ports of the network device in a predictable sequence based on the system identification values associated with the potential aggregation group until all aggregator ports have been associated with a potential aggregation group or all potential aggregation groups have been associated with an aggregator port. If all of the aggregator ports have been associated with an aggregation group and more potential aggregation groups exist, then the physical ports of potential aggregation groups which have not been associated with an aggregator port may be used as single port links.

In a particular embodiment of the present invention, the link aggregation message is a link aggregation control protocol message. Furthermore, the predictable sequence may be an ascending sequence based on system identification value.

In a still further embodiment of the present invention, a subsequent link aggregation message is received from one of the physical ports of the network device not associated with an aggregator port. The link aggregation message is received after either the expiration of the hold time or the receipt of a message from each of the physical ports of the network device. The received subsequent message is parsed for a system identification and port key of a remote system associated with the one of the physical ports. It is then determined if the system identification of the subsequent message is of a lower value than the system identifications of any of the physical port groups previously associated with an aggregator port. The association of an aggregation group with the highest system identification to an aggregator port is then terminated and the physical port of the received second message associated with an aggregator port in the predictable sequence if such is the case.

While the invention has been described above primarily with respect to the method aspects of the invention, both systems and computer program products are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one skilled in the art, the present invention may be embodied as methods, systems or computer program products. Accordingly, the present invention may take the form of a hardware embodiment, a software embodiment or an embodiment combining software and hardware aspects.

Figure 1:
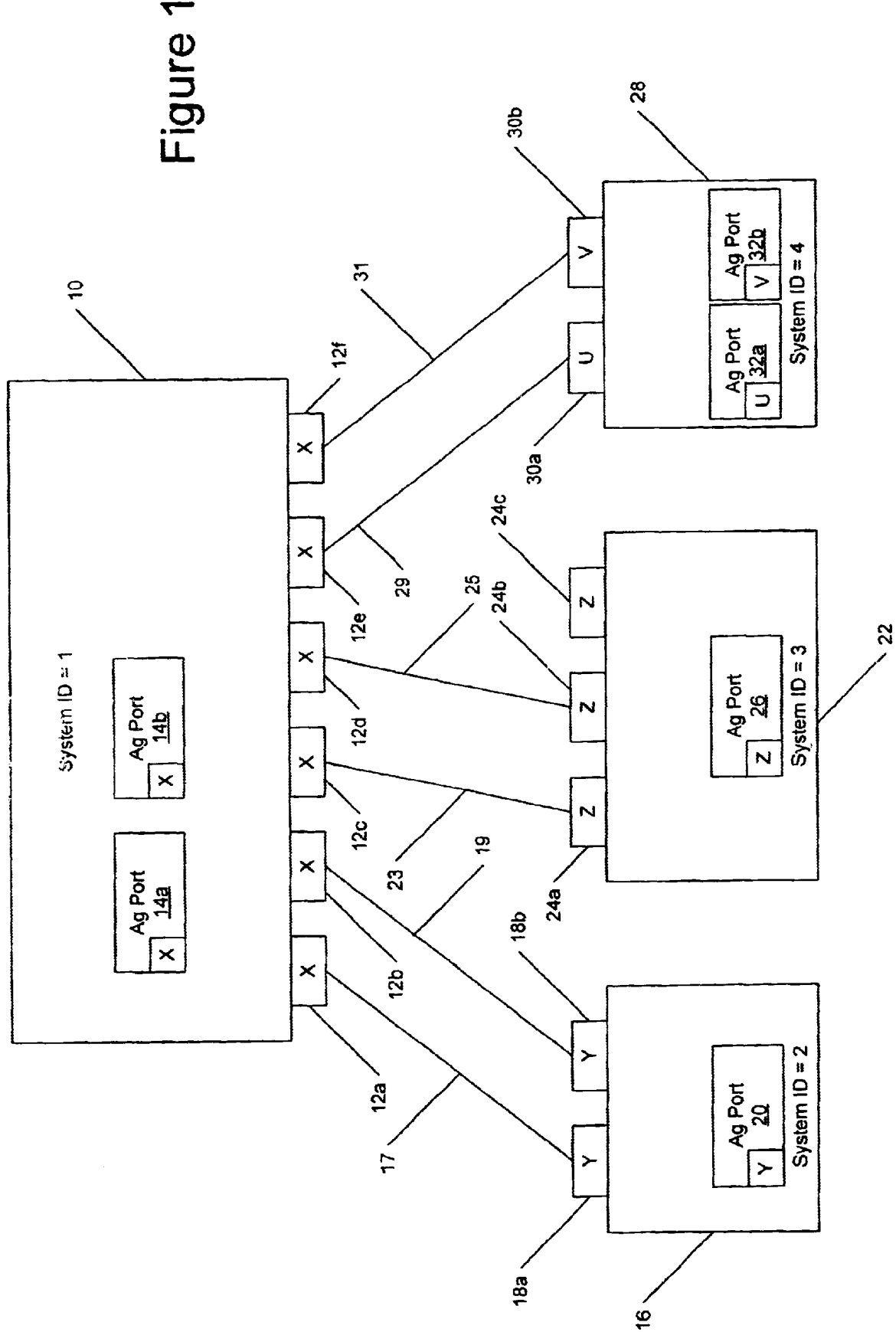
FIG. 1 is a block diagram of a computer network suitable for use with the present invention.

FIG. 1 illustrates an embodiment of a computer network suitable for use with the present invention. As seen in FIG. 1, a network device 10 such as a network switch or router, may have several physical ports 12a through 12f. The physical ports 12a through 12f provide connections to other network devices 16, 22 and 28 and their respective physical ports 18a, 18b, 24a through 24c, 30a and 30b over communication links 17, 19, 23, 25, 29 and 31. Each of the network devices 10, 16, 22 and 28 also include respective aggregator ports 14a, 14b, 20, 26, 32a and 32b. Preferably, the network devices 10, 16, 22 and 28 implement the proposals of the IEEE 802.3ad Task Force for defining the IEEE standard for Link Aggregation.

The physical ports of each of the network devices 10, 16, 22 and 28 are each assigned local key values. As is illustrated in FIG. 1, each of the physical ports 12a through 12f are assigned local key values of X, physical ports 18a and 18b are assigned local key values of Y, physical ports 24a through 24c are assigned local key values of Z, physical port 30a is assigned a local key value of U and physical port 30b is assigned a local key value of V. Each aggregator port is also assigned a local key value. Thus, aggregator ports 14a and 14b may be assigned a local key value of X, aggregator port 20 assigned a local key value of Y, aggregator port 26 assigned a local key value of Z, aggregator port 32a assigned a local key value of U and aggregator port 32b assigned a local key value of V.

As is further illustrated in FIG. 1, each of the network devices also has associated with it a system identification (System ID). The System ID is preferably session invariant and globally unique in that the System ID of the network devices do not change from session to session (e.g., across power cycles or service cycles) and that no two network devices in the same system have the same System ID. Thus, for example, network device 10 would be assigned a System ID value of 1 each time network device 10 is configured and no other network device in the system would be assigned the System ID value of 1. One example of a session invariant value which may be used as the System ID value of network device 10 is an IEEE assigned globally assigned unique address. This MAC address does not change from session to session and, therefore, may be used across multiple configuration sessions to provide predictable results. Furthermore, the MAC address is typically unique within a network and, therefore, allows for the unique identification of a network device.

As is seen in FIG. 1, each of the network devices 10, 16, 22 and 28 are assigned respective unique System ID values. Thus, for network device 10, the System ID value is 1, for network device 16, the System ID value is 2, for network device 22, the System ID value is 3 and for network device 28, the System ID value is 4. The System ID values illustrated in FIG. 1 have been simplified for illustrative purposes. As will be appreciated by those of skill in the art, the System ID values may be multiple bit address values or other such suitable identifiers.

Figure 2:
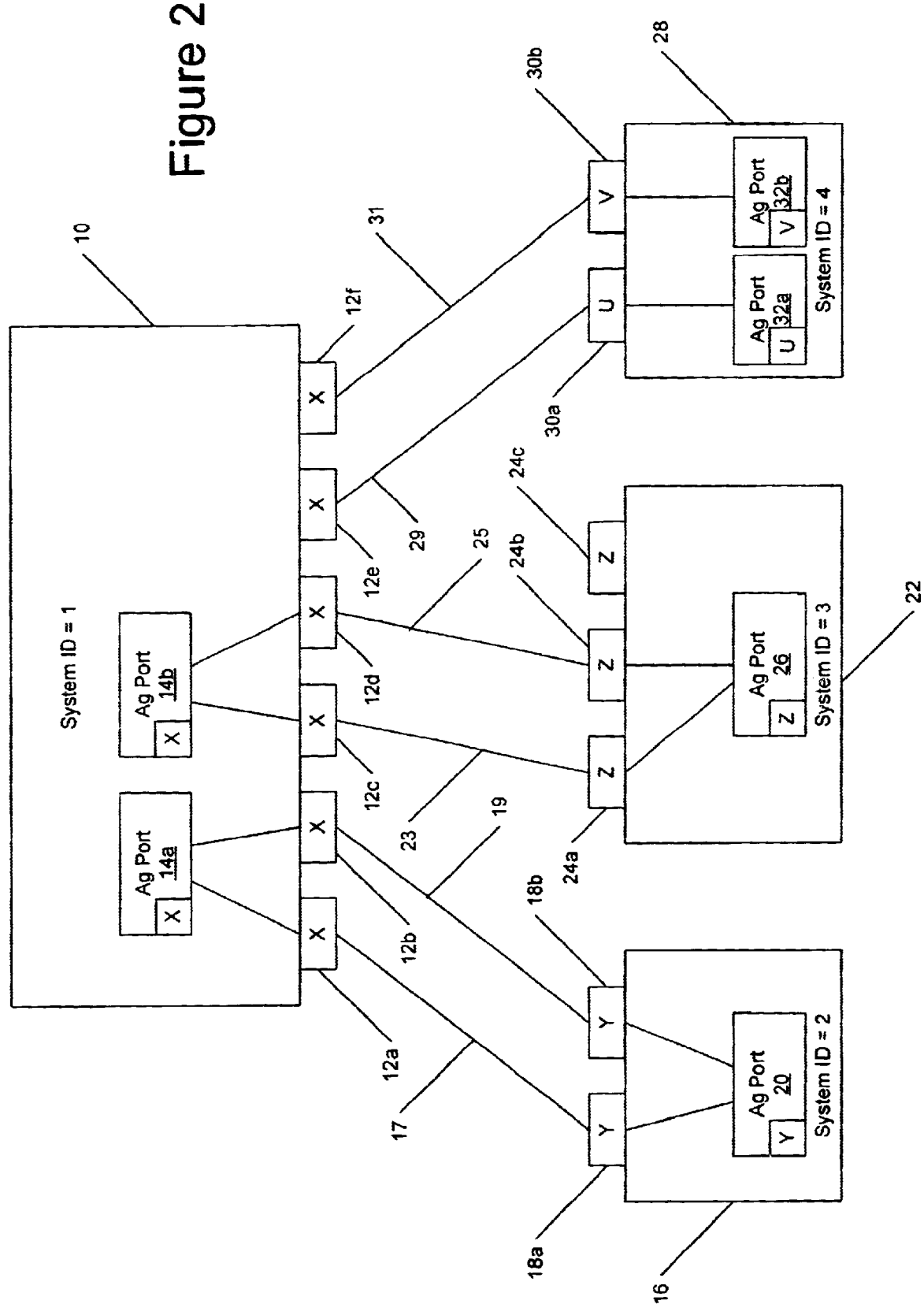
FIG. 2 is a block diagram of a computer network configured according to the present invention.

While FIG. 1 illustrates the interconnection of an exemplary network before aggregation, FIG. 2 illustrates the network of FIG. 1 after aggregation utilizing the teachings of the present invention. The lines between the aggregator ports 14a, 14b, 20, 26, 32a and 32b and the physical ports 12a through 12f, 18a, 18b, 24a through 24c, 30a and 30b illustrate the association of the physical ports with an aggregator port. The manner in which the aggregation groups are associated with aggregator ports is described in the flow chart of FIG. 3. Thus, FIG. 2 may best be described with reference to the operations illustrated in FIG. 3.

Operations of the present invention will now be described with respect to the flowcharts of FIG. 3 and FIG. 4. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 3:
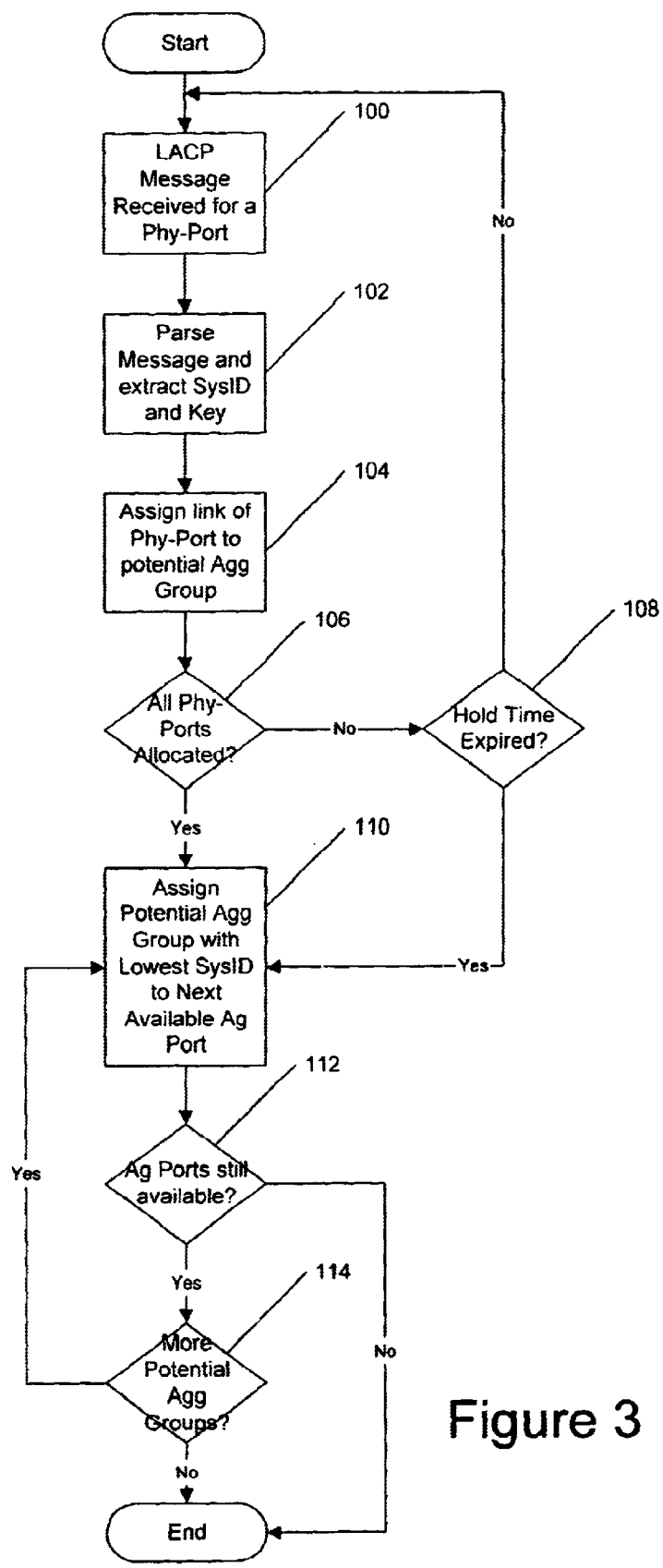
FIG. 3 is a flowchart illustrating operations of a particular embodiment of the present invention.
Figure 4:
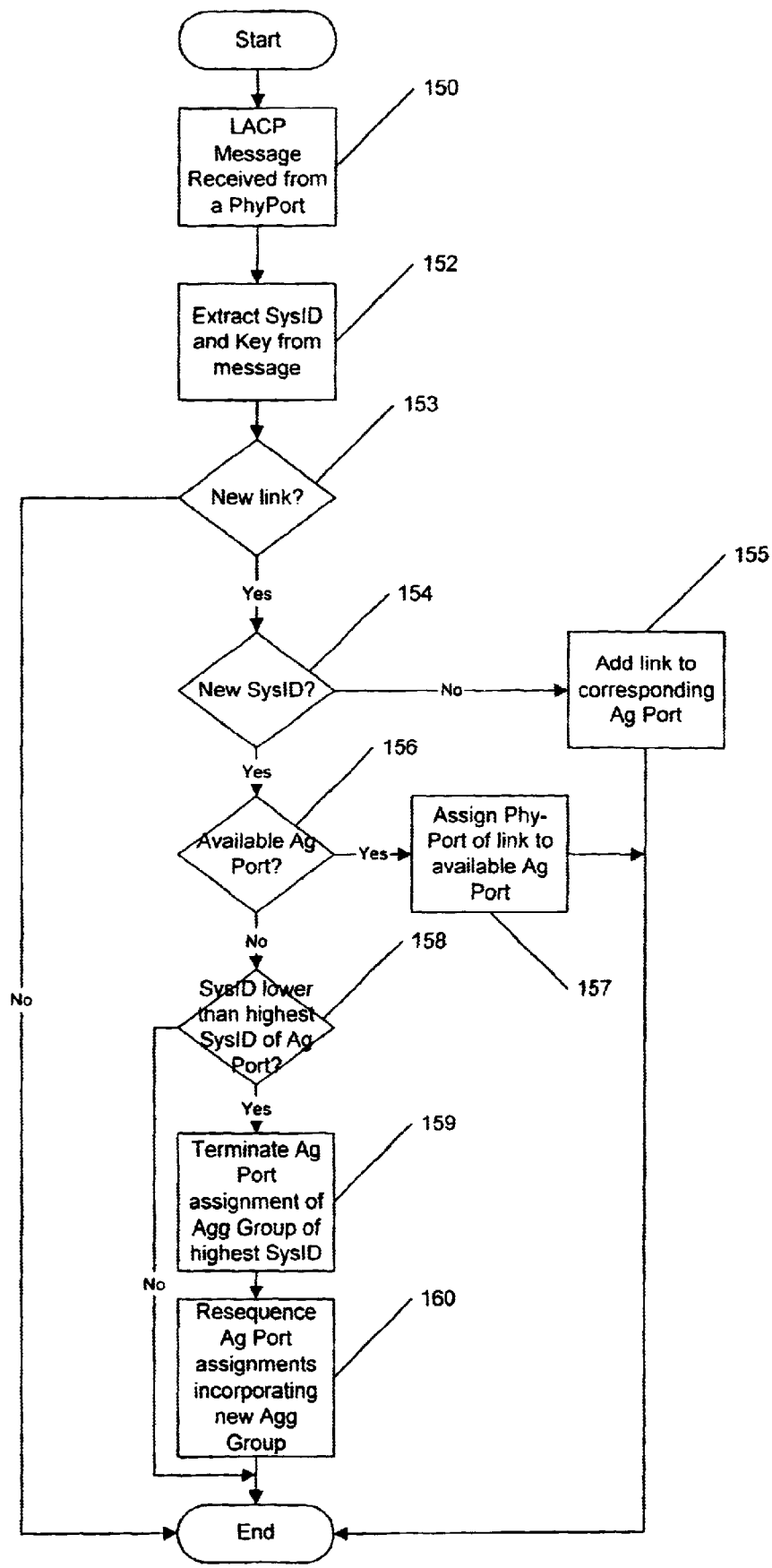
FIG. 4 is a flowchart of a particular embodiment of the present invention where, optionally, a physical port becomes capable of aggregation after the hold time.

Referring now to the flowchart of FIG. 3, operations for the selection of aggregator port assignments for physical (Phy) ports of a network device during a configuration period corresponding to a hold time are illustrated. As seen in FIG. 3, the determination of whether a physical port is to be associated with an aggregator port begins when the network device 10 receives a message, such as a link aggregation control protocol (LACP) message, from another network device such as network device 16 (block 100) (a proposed format and standard for the LACP messages may be found in the IEEE Draft P802.3ad/D1.1 Supplement to CSMA/CD Access Method & Physical Layer Specifications: Link Aggregation which is incorporated herein by reference as if set forth fully herein). For example, network device 16 uses physical port 18a to send an LACP message over physical link 17 to physical port 12a of network device 10. A similar message would be sent by physical port 18b over link 19 to physical port 12b. Likewise, network device 22 would use ports 24a and 24b to send LACP messages over links 23 and 25 to physical ports 12c and 12d of network device 10. Finally, network device 28 would use physical ports 30a and 30b to send LACP messages over links 29 and 31 to physical ports 12e and 12f.

While LACP messages may be transmitted any time a link is activated, the LACP messages utilized in the grouping of physical links into aggregation groups are preferably sent and received during an initial "hold time" which occurs on power up of network device 10. Thus, the messages may be sent during this initial hold time when each of the network devices 16, 22 and 28 detects the availability of links to network device 10. Alternatively, the LACP messages may also be sent periodically over each link capable of aggregation.

Returning to FIG. 3, when an LACP message is received, the message is parsed to extract the System ID of the remote device transmitting the message and the key value of the physical port on the remote device through which the message is sent (block 102). After determining the System ID and key of the remote physical port, the associated link is assigned to a potential aggregation group as described above (block 104). Thus, all links with compatible link parameters and with identical remote System ID values and port key values would be assigned to the same potential aggregation group. Thus, for example, when a LACP message is received over links 17 and 19, these links will be placed in the same potential aggregation group because both messages would include a System ID equal to 2, remote port key values equal to Y and local port key values equal to X. In FIG. 2, aggregation groups would include in a first group, physical ports 12a and 12b, in a second group, physical ports 12c and 12d, in a third group, physical port 12e, and in a fourth group, physical port 12f.

After the link is assigned to a potential aggregation group, it is determined if all physical ports of the network device 10 have been assigned to a potential aggregation group (block 106). If fewer than all of the ports have been assigned and the hold time has not expired (block 108), then network device 10 waits for receipt of the next LACP message.

However, if the hold time has expired or all of the physical ports of network device 10 have been assigned to a potential aggregation group, then the potential aggregation groups are associated with aggregator ports (block 110). The association of potential aggregation groups with aggregator ports is made based on the System ID of the remote device. As is seen in block 110, potential aggregation groups may be associated with aggregator ports in sequential order where the potential aggregation group with the lowest value System ID is associated with an aggregator port. Thus, as seen in FIG. 2, the potential aggregation group with links 17 and 19 would be associated with an aggregator port before the potential aggregation group with links 23 and 25 because the System ID of network device 16 is lower in value than the System ID of network device 22.

After associating the potential aggregation group with an aggregator port, network device 10 then determines if all of its aggregator ports 14a and 14b have been associated with potential aggregation groups (block 112). If all of the aggregator ports have been associated with an aggregator port, then the association process ends. The remaining links which have not been associated with aggregator ports may be treated as individual links. Thus, for example, in FIG. 2, after association of aggregator port (Ag port) 14a with links from network device 16 and association of aggregator port (Ag port) 14b with links from network device 22, the links from network device 28 are not associated with an aggregator port and may be treated as single links.

If aggregator ports remain which are not associated with a potential aggregation group, then it is determined if there are remaining potential aggregation groups (block 114). If no more potential aggregation groups remain which are not associated with an aggregator port, then all potential aggregation groups have been associated and the configuration process is complete. However, if potential aggregation groups remain which are not associated with an aggregator port, then the remaining potential aggregation group with the lowest System ID is associated with the next available aggregator port (block 110). This process repeats until either all aggregator ports have been associated with an aggregation group or until all potential aggregation groups have been associated with an aggregator port.

By associating aggregator ports with potential aggregation groups in a predictable sequence based on a session invariant value, such as System ID, the present invention provides for the deterministic selection of the aggregator interface. Thus, because the System ID values of each of the network devices remains constant, the same links will be associated with aggregator ports in network device 10 from configuration session to configuration session. Thus, a predictable configuration may be achieved even when there are more potential aggregation groups than aggregator ports.

While the present invention has been described with reference to the association of aggregator ports with aggregation groups based on the System ID, the potential exists for ambiguity in the event of interconnection of two network devices with each having more than one aggregator port. Such a case is illustrated in FIG. 2 by network device 28. If a third aggregator port was available in network device 10 (not shown), then the association of the third aggregator port with either link 29 or link 31 may be based on both System ID and the key value of the remote port. Thus, even if two potential aggregation groups have the same System ID, the key value may be used to distinguish between the two groups for purposes of associating the groups with an aggregator port. Thus, in the present example, link 29 would be associated with the third aggregator port because the key value of the physical port 30a is lower in value than the key value of physical port 30b. Accordingly, the deterministic nature of the present invention may be maintained.

As will be appreciated by those of skill in the art, the association of a link to an aggregator port may be accomplished by associating the physical port of the network device with the aggregator port of the network device. Such an association may be accomplished in any number of ways known to those of skill in the art. Furthermore, the specific manner in which links are associated with aggregation groups may vary between network devices. For example, a network switch may use a method which differs from a network router. Accordingly, the present invention should not be construed as limited to any particular mechanism for associating physical links with aggregator ports.

While the present invention has been described with respect to association of potential aggregation groups in ascending sequential order, as will be appreciated by those of skill in the art, other sequences may also be utilized. For example, descending sequential order may be utilized. Thus, the benefits of the present invention may be achieved from use of any sequence of assignments which may be predicted based on a session invariant value, such as the System ID.

Because the present invention utilizes the session invariant value System ID to determine aggregator port associations, it may be desirable to update the aggregator port associations if later aggregation messages are received or if additional links to new devices are established. An optional procedure for such an update is illustrated in FIG. 4. As seen in FIG. 4, the operations of this optional update procedure may begin when an LACP message requesting aggregation is received after either all physical ports have been associated with an aggregation group or after the hold time has expired (block 150). The received message is parsed, as described above, and the System ID and remote port key values are extracted (block 152). It is then determined if the message was received from a link which is not currently associated with an aggregator port (block 153). If the message was received from a link currently associated with an aggregator port, then no further action need be taken as the link is already aggregated and the update process ends.

If the message was received from a link not currently associated with an aggregator port, then it is determined if the System ID of the message corresponds to a System ID of an aggregation group currently associated with an aggregator port (block 154). If the link from which the message was received does have the same System ID as a System ID associated with an aggregator port, then the link is added to the corresponding aggregation group and associated with the aggregator port (block 155).

If the System ID of the received message is not the same as a System ID currently associated with an aggregator port, then it is determined if there is an available aggregator port (block 156). If there is an available aggregator port, then the physical port of the link is associated with the available aggregator port (block 157). If no aggregator port is available (i.e. all aggregator ports have associated aggregation groups), it is determined if the System ID of the received message is of a lower value than the highest value System ID of an aggregation group associated with an aggregator port (block 158). If the System ID of the received message is higher than the highest value System ID associated with an aggregator port, then the link from which the message was received is to be treated as a single link and the update process ends.

If the System ID of the received message is lower than the highest value System ID associated with an aggregator port then the association of the aggregation group having the highest System ID is terminated and the aggregator port made available for reassignment (block 159). Thus, the present invention determines if the System ID value is within the sequence of System ID values associated with the aggregator ports of the network device 10. As used herein, the phrase "within the sequence" refers to a System ID value which falls before the last system identification value associated with physical links associated with aggregator ports in the predictable sequence. Thus, in the present example, a System ID which was below the highest System ID associated with an aggregator port would be considered "within the sequence" of System ID values associated with the aggregator ports of network device 10.

The the association of aggregation groups with aggregator ports is then resequenced to maintain the predictable sequence and the physical port of the link from which message was received is assigned to the aggregator port corresponding to the System ID of the link in the predictable sequence (block 160). Thus, the aggregator port with a System ID at the boundary of the sequence of System ID values assigned to aggregator ports of network device 10 is replaced with another System ID in the predictable sequence so as to maintain the sequential nature of the aggregator port associations.

While the update procedure has been described with respect to a predictable sequence of aggregator port assignments corresponding to an ascending sequential assignment based on System ID, as will be appreciated by those of skill in the art, any suitable sequence may be utilized as described above. Furthermore, by maintaining the association of aggregator ports with physical ports and, therefore, physical links, in the predictable sequence and by updating that association even as the characteristics of the network configuration vary, the present invention provides that the state of the aggregator port to link associations will have a fixed relationship with the configuration of the network. Thus, for example, the present invention may assure that after a power outage or other service interruption or event resulting in reconfiguration the aggregator port to link associations will return to the state before the event if the network returns to the same configuration as existed at the time of the event.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of associating physical links to a network device with aggregator ports of the network device, the method comprising the steps of:
    associating physical links with the aggregator ports of the network device in a predictable sequence based on a session invariant characteristic of the physical links until at least one of, all of the aggregator ports of the network device have been assigned physical links and, all of the physical links capable of aggregation have been assigned an aggregator port; and
    connecting remaining physical links as single links to the network device irrespective of the physical links capability to aggregate.

2. A method according to claim 1, wherein the associating step comprises the steps of:
    determining a system identification associated with a remote end of each of the physical links connected to the network device;
    determining a port key associated with the remote end of each of the physical links connected to the network device; and
    associating physical links with the aggregator ports of the network device in a predictable sequence based on both the system identification and the port key associated with the physical link.

3. A method according to claim 2, wherein the step of associating physical links with the aggregator ports of the network device in a predictable sequence based on both the system identification and the port key associated with the physical link comprises the step of associating physical links with the same system identification value and port key value with the same aggregator port in a predictable order based on the system identification values of the physical links.

4. A method according to claim 3, wherein the predictable order is sequential order.

5. A method according to claim 2, wherein the system identification is a media access control (MAC) address associated with a system at the remote end of the physical links.

6. A method according to claim 4, further comprising the step of terminating an association of physical links with an aggregator port if a request is received to aggregate physical links having a system identification within the sequence of system identifications of physical links associated with aggregator ports.

7. A method according to claim 6, wherein the association of physical links with an aggregator port terminated is an association of physical links having a system identification value at the boundary of the sequence of system identification values associated with aggregator ports.

8. A method of associating physical ports with aggregator ports of a network device, the method comprising the steps of:
    receiving a link aggregation message from one of the physical ports of the network device;
    parsing the received message for a system identification and port key of a remote system associated with the one of the physical ports;
    assigning the one of the physical ports from which the message was received to a potential aggregation group based on the system identification and port key values of the remote system associated with the one of the physical ports;
    determining if, at least one of, a message has been received from each of the physical ports of the network device and expiration of a hold time, has occurred; and
    associating potential aggregation groups with the aggregator ports of the network device in a predictable sequence based on the system identification values associated with the potential aggregation group until all aggregator ports have been associated with a potential aggregation group if at least one of, a message has been received from each of the physical ports of the network device and expiration of a hold time, has occurred.

9. A method according to claim 8, further comprising the steps of:
    determining if all of the aggregator ports have been associated with a potential aggregation group; and
    utilizing physical ports of potential aggregation groups which have not been associated with an aggregator port as single port links if all of the aggregator ports have been associated with a potential aggregation group.

10. A method according to claim 8, wherein the link aggregation message is a link aggregation control protocol message.

11. A method according to claim 9, wherein the predictable sequence is an ascending sequence based on system identification.

12. A method according to claim 8, further comprising the steps of:
    receiving a subsequent link aggregation message from one of the physical ports of the network device, wherein the second link aggregation message is received after the occurrence of one of expiration of the hold time and receiving a message from each of the physical ports of the network device;

parsing the received subsequent message for a system identification and port key of a remote system associated with the one of the physical ports;

determining if the system identification of the subsequent message is of a lower value than the system identifications of any of the physical ports associated is with an aggregator port;

terminating the association of an aggregation group with an aggregator port with an associated system identification at a boundary of the predictable sequence; and associating the physical port of the received subsequent message with an aggregator port according to the predictable sequence.

13. A method according to claim 8, wherein the system identification is a media access control (MAC) address.

14. A system associating physical links to a network device with aggregator ports of the network device, comprising:

means for associating physical links with the aggregator ports of the network device in a predictable sequence based on a session invariant characteristic of the physical links until at least one of, all of the aggregator ports of the network device have been assigned physical links and, ail of the physical links capable of aggregation have been assigned an aggregator port; and means for connecting remaining physical links as single links to the network device irrespective of the physical links capability to aggregate.

15. A system according to claim 14, wherein the means for associating comprises:

means for determining a system identification associated with a remote end of each of the physical links connected to the network device;

means for determining a port key associated with the remote end of each of the physical links connected to the network device; and means for associating physical links with the aggregator ports of the network device in a predictable sequence based on both the system identification and the port key associated with the physical link.

16. A system according to claim 15, wherein the means for associating physical links with the aggregator ports of the network device in a predictable sequence based on both the system identification and the port key associated with the physical link comprises means for associating physical links with the same system identification value and port key value with the same aggregator port in a predictable order based on the system identification values of the physical links.

17. A system according to claim 16, wherein the predictable order is sequential order.

18. A system according to claim 15, wherein the system identification is a media access control (MAC) address associated with a system at the remote end the physical links.

19. A system according to claim 17, further comprising means for terminating an association of physical links with an aggregator port if a request is received to aggregate physical links having a system identification within the sequence of system identifications of physical link s associated with aggregator ports.

20. A system according to claim 19, wherein the association of physical links with an aggregator port terminated is an association of physical links having a system identification value at the boundary of the sequence of system identification values associated with aggregator ports.

21. A system for associating physical ports with aggregator ports of a network device, comprising:

means for receiving a link aggregation message from one of the physical ports of the network device;

means for parsing the received message for a system identification and port key of a remote system associated with the one of the physical ports;

means for assigning the one of the physical ports from which the message was received to a potential aggregation group based on the system identification and port key values of the remote system associated with the one of the physical ports;

means for determining if, at least one of, a message has been received from each of the physical ports of the network device and expiration of a hold time, has occurred; and means for associating potential aggregation groups with the aggregator ports of the network device in a predictable sequence based on the system identification values associated with the potential aggregation group until all aggregator ports have been associated with a potential aggregation group if at least one of, a message has been received from each of the physical ports of the network device and expiration of a hold time, has occurred.

22. A system according to claim 21, further comprising:

means for determining if all of the aggregator ports have been associated with a potential aggregation group; and means for utilizing physical ports of potential aggregation groups which have not been associated with an aggregator port as single port links if all of the aggregator ports have been associated with a potential aggregation group.

23. A system according to claim 21, wherein the link aggregation message is a link aggregation control protocol message.

24. A system according to claim 22, wherein the predictable sequence is an ascending sequence based on system identification.

25. A system according to claim 21, further comprising:

means for receiving a subsequent link aggregation message from one of the physical ports of the network device, wherein the second link aggregation message is received after the occurrence of one of expiration of the hold time and receiving a message from each of the physical ports of the network device;

means for parsing the received subsequent message for a system identification and port key of a remote system associated with the one of the physical ports;

means for determining if the system identification of the subsequent message is of a lower value than the system identifications of any of the physical ports associated with an aggregator port;

means for terminating the association of an aggregation group with an aggregator port with an associated system identification at a boundary of the predictable sequence; and means for associating the physical port of the received subsequent message with an aggregator port according to the predictable sequence.

26. A system according to claim 21, wherein the system identification is a media access control (MAC) address.

27. A computer program product for associating physical links to a network device with aggregator ports of the network device, comprising:

a computer-readable storage medium having computer-readable program code means embodied in said medium, said computer-readable program code means comprising:

computer-readable program code means for associating physical links with the aggregator ports of the network device in a predictable sequence based on a session invariant characteristic of the physical links until at least one of, all of the aggregator ports of the network device have been assigned physical links and, all of the physical links capable of aggregation have been assigned an aggregator port; and computer-readable program code means for connecting remaining physical links as single links to the network device irrespective of the physical links capability to aggregate.

28. A computer program product according to claim 27, wherein the computer-readable program code means for associating comprises:

computer-readable program code means for determining a system identification associated with a remote end of each of the physical links connected to the network device;

computer-readable program code means for determining a port key associated with the remote end of each of the physical links connected to the network device; and computer-readable program code means for associating physical links with the aggregator ports of the network device in a predictable sequence based on both the system identification and the port key associated with the physical link.

29. A computer program product according to claim 28, wherein the computer-readable program code means for associating physical links with the aggregator ports of the network device in a predictable sequence based on both the system identification and the port key associated with the physical link comprises computer-readable program code means for associating physical links with the same system identification value and port key value with the same aggregator port in a predictable order based on the system identification values of the physical links.

30. A computer program product according to claim 29, wherein the predictable order is sequential order.

31. A computer program product according to claim 28, wherein the system identification is a media access control (MAC) address associated with a system at the remote end the physical links.

32. A computer program product according to claim 30, further comprising computer-readable program code means for terminating an association of physical links with an aggregator port if a request is received to aggregate physical links having a system identification within the sequence of system identifications of physical links associated with aggregator ports.

33. A computer program product according to claim 32, wherein the association of physical links with an aggregator port terminated is an association of physical links having a system identification value at the boundary of the sequence of system identification values associated with aggregator ports.

34. A computer program product for associating physical ports with aggregator ports of a network device, comprising:

a computer-readable storage medium having computer-readable program code means embodied in said medium, said computer-readable program code means comprising:

computer-readable program code means for receiving a link aggregation message from one of the physical ports of the network device;

computer-readable program code means for parsing the received message for a system identification and port key of a remote system associated with the one of the physical ports;

computer-readable program code means for assigning the one of the physical ports from which the message was received to a potential aggregation group based on the system identification and port key values of the remote system associated with the one of the physical ports;

computer-readable program code means for determining if, at least one of, a message has been received from each of the physical ports of the network device and expiration of a hold time, has occurred; and computer-readable program code means for associating potential aggregation groups with the aggregator ports of the network device in a predictable sequence based on the system identification values associated with the potential aggregation group until all aggregator ports have been associated with a potential aggregation group if at least one of, a message has been received from each of the physical ports of the network device and expiration of a hold time, has occurred.

35. A computer program product according to claim 34, further comprising:

computer-readable program code means for determining if all of the aggregator ports have been associated with a potential aggregation group; and computer-readable program code means for utilizing physical ports of potential aggregation groups which have not been associated with an aggregator port as single port links if all of the aggregator ports have been associated with a potential aggregation group.

36. A computer program product according to claim 34, wherein the link aggregation message is a link aggregation control protocol message.

37. A computer program product according to claim 35, wherein the predictable sequence is an ascending sequence based on system identification.

38. A computer program product according to claim 34, further comprising:

computer-readable program code means for receiving a subsequent link aggregation message from one of the physical ports of the network device, wherein the second link aggregation message is received after the occurrence of one of expiration of the hold time and receiving a message from each of the physical ports of the network device;

computer-readable program code means for parsing the received subsequent message for a system identification and port key of a remote system associated with the one of the physical ports;

computer-readable program code means for determining if the system identification of the subsequent message is of a lower value than the system identifications of any of the physical ports associated with an aggregator port;

computer-readable program code means for terminating the association of an aggregation group with an aggregator port with an associated system identification at a boundary of the predictable sequence; and computer-readable program code means for associating the physical port of the received subsequent message with an aggregator port according to the predictable sequence.

39. A computer program product according to claim 34, wherein the system identification is a media access control (MAC) address.

* * * * *